(12) United States Patent
Kawashima

(10) Patent No.: US 7,702,276 B2
(45) Date of Patent: Apr. 20, 2010

(54) AUTOMATIC DOCUMENT FEEDER AND IMAGE FORMING APPARATUS EQUIPPED WITH THE SAME

(75) Inventor: Shinsuke Kawashima, Osaka (JP)

(73) Assignee: Kyocera Mita Corporation (JP)

( * ) Notice: Subject to any disclaimer, the term of this patent is extended or adjusted under 35 U.S.C. 154(b) by 281 days.

(21) Appl. No.: 11/439,856

(22) Filed: May 24, 2006

(65) Prior Publication Data

US 2006/0268376 A1 Nov. 30, 2006

(30) Foreign Application Priority Data

May 30, 2005 (JP) .............................. 2005-156676

(51) Int. Cl.
 *G03G 15/00* (2006.01)
(52) U.S. Cl. ..................... 399/367; 399/365; 399/380
(58) Field of Classification Search ................ 399/365, 399/367, 380
 See application file for complete search history.

(56) References Cited

U.S. PATENT DOCUMENTS 6,619,649 B2 * 9/2003 Takamatsu ................. 271/3.14

FOREIGN PATENT DOCUMENTS

JP 11-106086 4/1999
JP 2002-274694 9/2002

\* cited by examiner

*Primary Examiner*—Ren Yan
*Assistant Examiner*—Andy L Pham
(74) *Attorney, Agent, or Firm*—Gerald E. Hespos; Michael J. Porco

(57) ABSTRACT

An automatic document feeder (3) has a front plate (12) located on one of opposite sides of the document feeder in a direction orthogonal to a feeding direction of documents P on a document tray (4), and on the side opposed to an operator. A rear plate (13) is on the other side opposed to the front plate (12). An intermediate transport unit (32) located between the front plate (12) and the rear plate (13) has a frame with an outer wall surface (37) serving as a lower guide surface of document transport path. The front plate (12) has an outer edge (33) at a height equal to or lower than the outer wall surface (37), so as to allow the operator to visually check the document (P) on the outer wall surface (37) from the direction orthogonal to the feeding direction of the documents (P).

17 Claims, 15 Drawing Sheets

AUTOMATIC DOCUMENT FEEDER AND IMAGE FORMING APPARATUS EQUIPPED WITH THE SAME

BACKGROUND OF THE INVENTION

1. Field of the Invention

The present invention relates to an automatic document feeder for allowing documents stacked on a document tray to be automatically fed to and read by an image reading section one-by-one, and an image forming apparatus, such as a copy machine, a facsimile machine or a complex machine thereof, which is equipped with the automatic document feeder.

2. Description of the Background Art

An automatic document feeder is designed to feed documents from a stack of documents placed on a document tray to an image reading section disposed at a given position, one-by-one, so as to allow data described in each of the documents to be read by the image reading section, and then eject the documents onto a document catch tray in sequence. This automatic document feeder can be subject to the risk of a paper jam occurring in a document transport path extending from the document tray to the document catch tray.

With a view to facilitating an operation for clearing a paper jam, Japanese Patent Laid-Open Publication No. 11-106086 discloses an automatic document feeder having an openable and closable feeder cover 100, as shown in FIGS. 12 and 13. More specifically, the automatic document feeder comprises the feeder cover 100 designed to be changed in posture between a closed position (see FIG. 12) and an opened position (see FIG. 13), and an intermediate transport unit 101 designed to be swingably moved in a direction toward which the feeder cover 100 has been opened, whereby each of a first transport path 103 leading to an image reading section 102 and a second transport path 104 extending from the image reading section 102 can be widened and exposed to outside to allow an operator to visually check a document in the first and second transport paths 103, 104 from a position obliquely above the automatic document feeder.

Japanese Patent Laid-Open Publication No. 2002-274694 also discloses an automatic document feeder having an openable and closable feeder cover 110, as shown in FIGS. 14 and 15. In this automatic document feeder, the feeder cover 110 is moved from a closed position (see FIG. 14) to an opened position (see FIG. 15), and then an inner guide 111 is swingingly moved (opened) in the same direction as an opening direction of the feeder cover 110. In conjunction with the swing movement of the inner guide 111, a feed guide 112 is moved in such a manner as to allow first and second transport paths 114, 115 defined, respectively, leading to and extending from an image reading section 113 to be widened and exposed to outside.

Typically, when used with an image forming apparatus, an automatic document feeder is mounted on an upper portion of the image forming apparatus. Thus, if a paper jam (document jam) occurs in the conventional automatic document feeders as disclosed in the Patent Laid-Open Publication Nos. 11-106086 and 2002-274694, an operator has to open the feeder cover (100; 110) and look the transport paths (103, 104; 114, 115) from a position obliquely above the image forming apparatus so as to visually check how a document jams in the transport paths (103, 104; 114, 115). This operation involves a problem that an operator who has difficulty in looking the automatic document feeder from a position obliquely above the image forming apparatus, for example, who is in a wheelchair, can hardly check a paper jam by his/her own eyes.

SUMMARY OF THE INVENTION

It is an object of the present invention to provide an automatic document feeder capable of allowing an operator who is in a relatively low posture, for example, in a wheelchair, to visually check a paper jam without difficulty, and an image forming apparatus equipped with the automatic document feeder.

In order to achieve the above object, the present invention provides an automatic document feeder for allowing documents stacked on a document tray to be automatically passed through an image reading section disposed at a given position, and ejected to a document catch tray, which comprises: a front plate located on a given one of opposite sides of the document feeder in a direction orthogonal to a feeding direction of the documents on the document tray; a rear plate located on the other side in the orthogonal direction and in opposed relation to the front plate; a first transport path located between the front plate and the rear plate, and adapted to guide the document fed from the document tray, to the image reading section; and a second transport path located between the front plate and the rear plate, and adapted to guide the document passed through the document tray, to the document catch tray. The front plate has an outer edge which is formed in a shape extending along the first transport path to allow the document located in a region of the first transport path between one end of the first transport path on the side of the document tray and the vicinity of the image reading section to be visually checked when viewed from the side of the front plate in the orthogonal direction.

The present invention further provides an image forming apparatus comprising: an apparatus body including a printing section for performing an image forming operation; and an automatic document feeder mounted on an upper portion of the apparatus body and designed to allow documents stacked on a document tray to be automatically passed through a given image reading section, and ejected to a document catch tray. This automatic document feeder has the above features.

According to the above automatic document feeder and image forming apparatus, even an operator which has difficulty in visually checking the automatic document feeder from a position obliquely above the automatic document feeder can check a document in the first transport path leading to the image reading section, from the direction orthogonal to a document transport direction of the automatic document feeder (from the front side of the automatic document feeder). This makes it possible to facilitate an operation for checking a document jam in the first transport path and an operation for clearing the jam (an operation for removing the jammed document).

DETAILED DESCRIPTION OF THE PREFERRED EMBODIMENTS

With reference to the drawings, the best mode of the present invention will now be described.

(Image Forming Apparatus)

Figure 1:
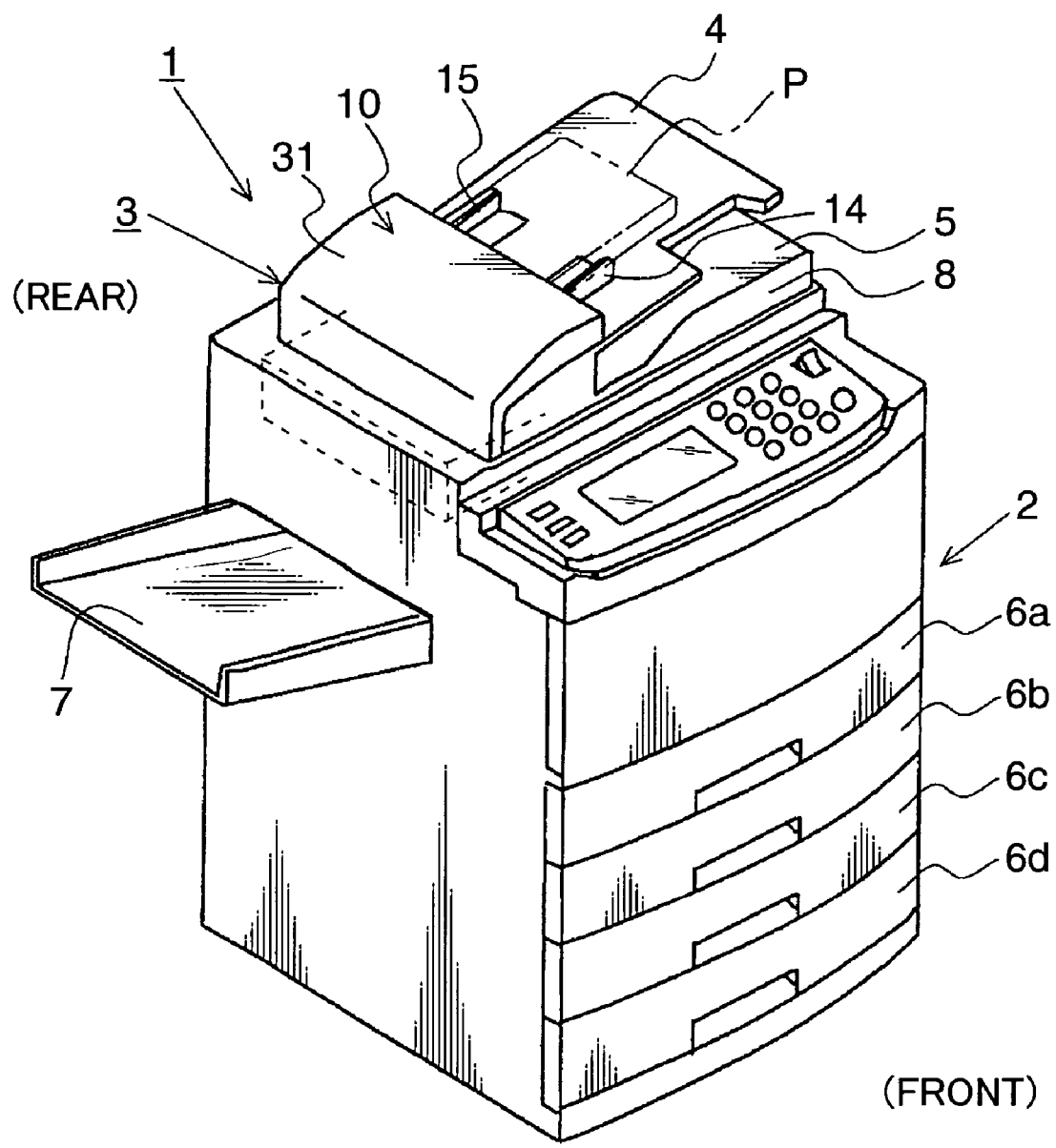
FIG. 1 is a perspective external view of an image forming apparatus using an automatic document feeder according to one embodiment of the present invention.

FIG. 1 is a perspective external view of an image forming apparatus 1 according to one embodiment of the present invention. The image forming apparatus 1 illustrated in FIG. 1 is complex machine having a copy function, a facsimile function and a printer function.

The image forming apparatus 1 comprises an apparatus body 2 for performing an image forming operation, and an automatic document feeder 3 mounted on the apparatus body 2. The apparatus body 2 includes a printing section (not shown) having an image forming unit and a fixing unit.

The image forming apparatus 1 is designed to feed documents P stacked on a document tray 4 of the automatic document feeder 3, to an image reading section (not shown in FIG. 1) disposed at an appropriate position of a top surface of the apparatus body 2, one-by-one, so as to read image data of the documents by the image reading section, and then eject the documents onto a document catch tray 5 of the automatic document feeder 3. The image forming apparatus 1 is also designed to print on a recording sheet fed from either one of a plurality of cassettes 6a to 6d based on image data read by the image reading section of the automatic document feeder 3 or other data transmitted from a personal computer, a copy machine, a facsimile machine or the like, and then eject the printed recording sheet onto a recording-sheet catch tray 7. The image forming apparatus of the present invention is not limited to an electrostatic type, but the present invention may be applied to an inkjet type.

(Automatic Document Feeder)

Figure 2:
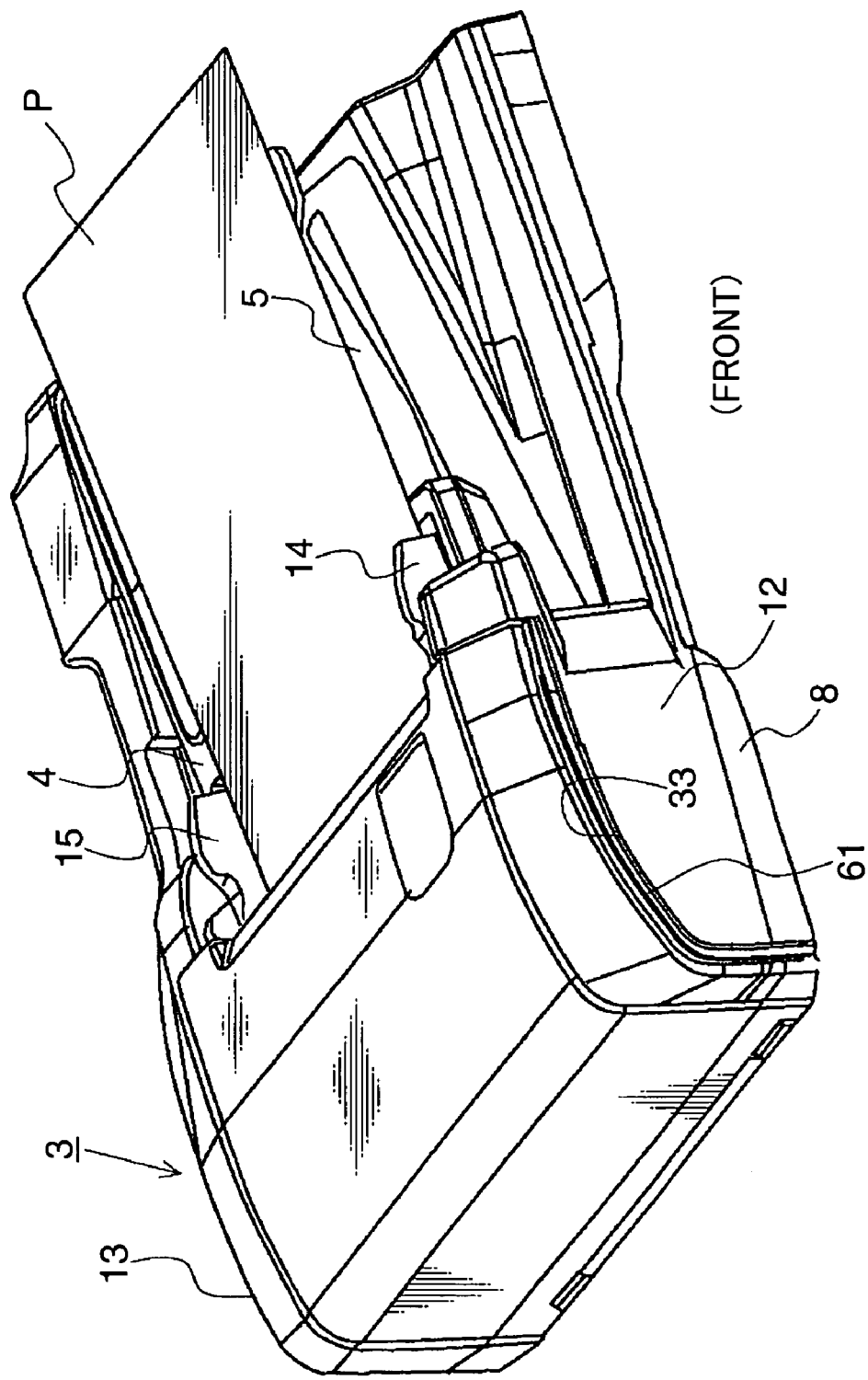
FIG. 2 is a perspective external view of the automatic document feeder.

FIG. 2 is a perspective external view of the automatic document feeder 3 according to one embodiment of the present invention. As shown in FIG. 2, the automatic document feeder 3 comprises a feeder body 8 attached to the upper portion of the apparatus body 2, the document tray 4 attached to an upper portion of the feeder body 8, and a document catch tray 5 formed below the document tray 4 (see FIG. 1).

Figure 3:
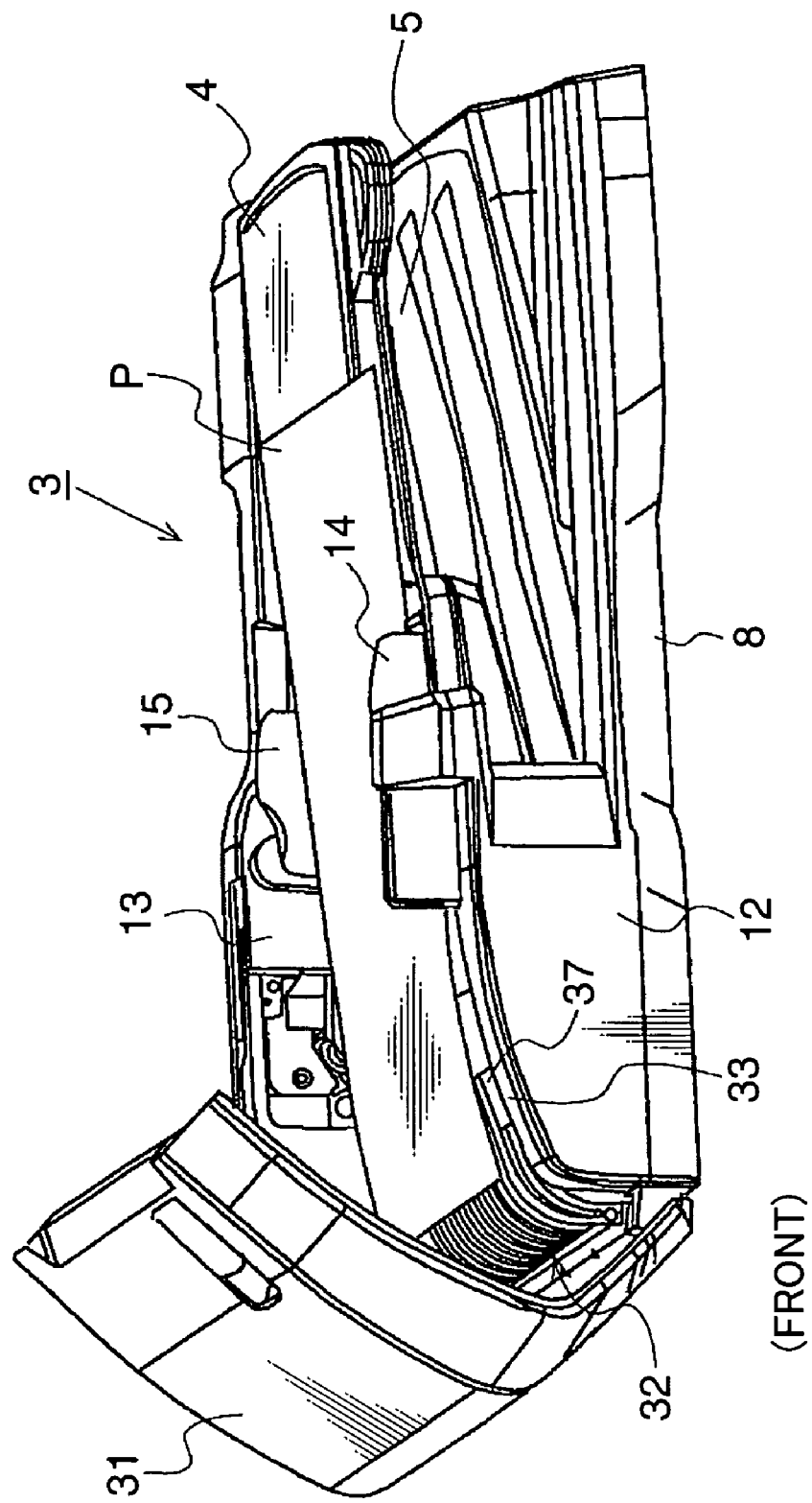
FIG. 3 is a perspective view showing the automatic document feeder, wherein a feeder cover of the automatic document feeder is partly opened.
Figure 4:
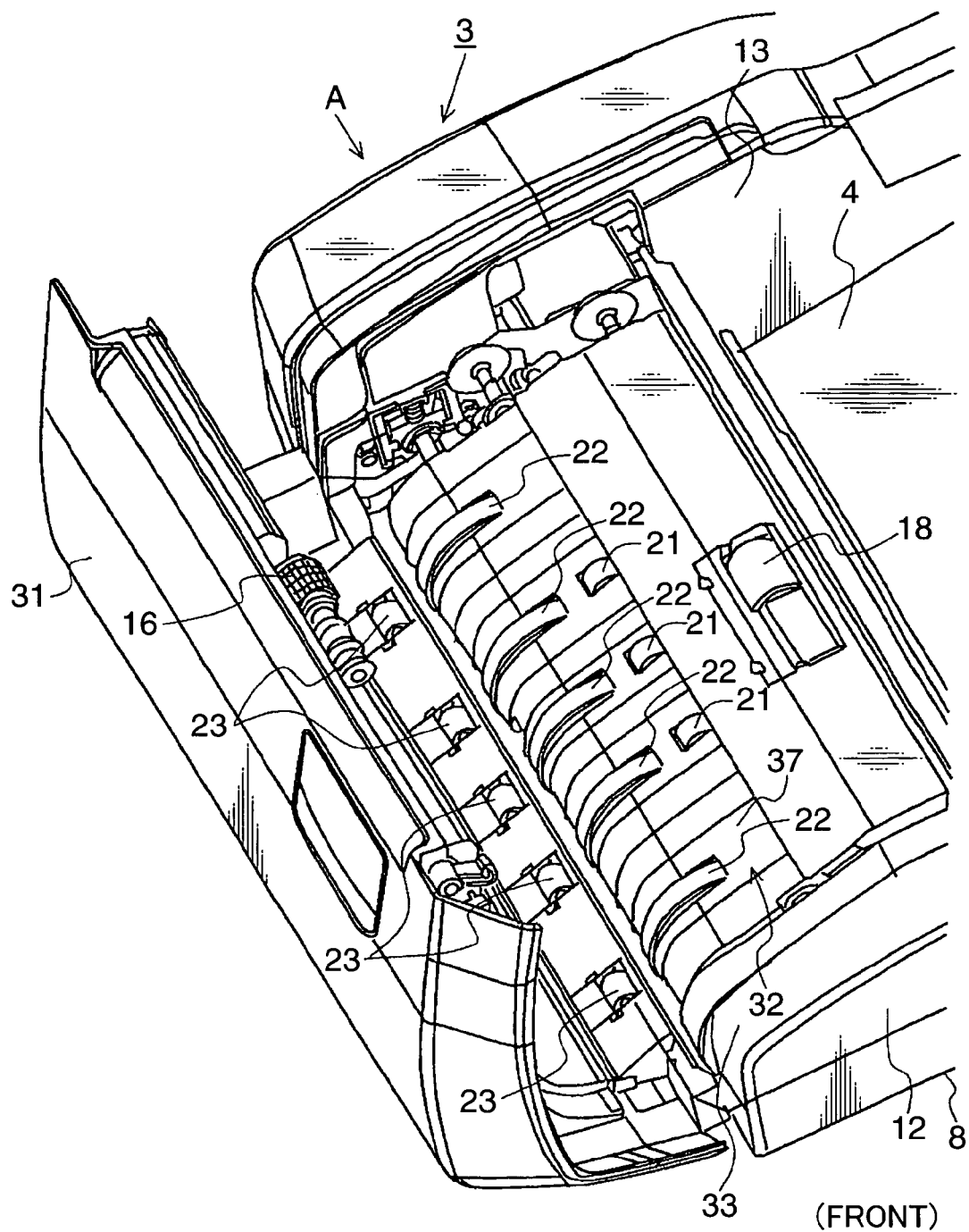
FIG. 4 is a perspective view showing the automatic document feeder, wherein the feeder cover feeder is fully opened.
Figure 6:
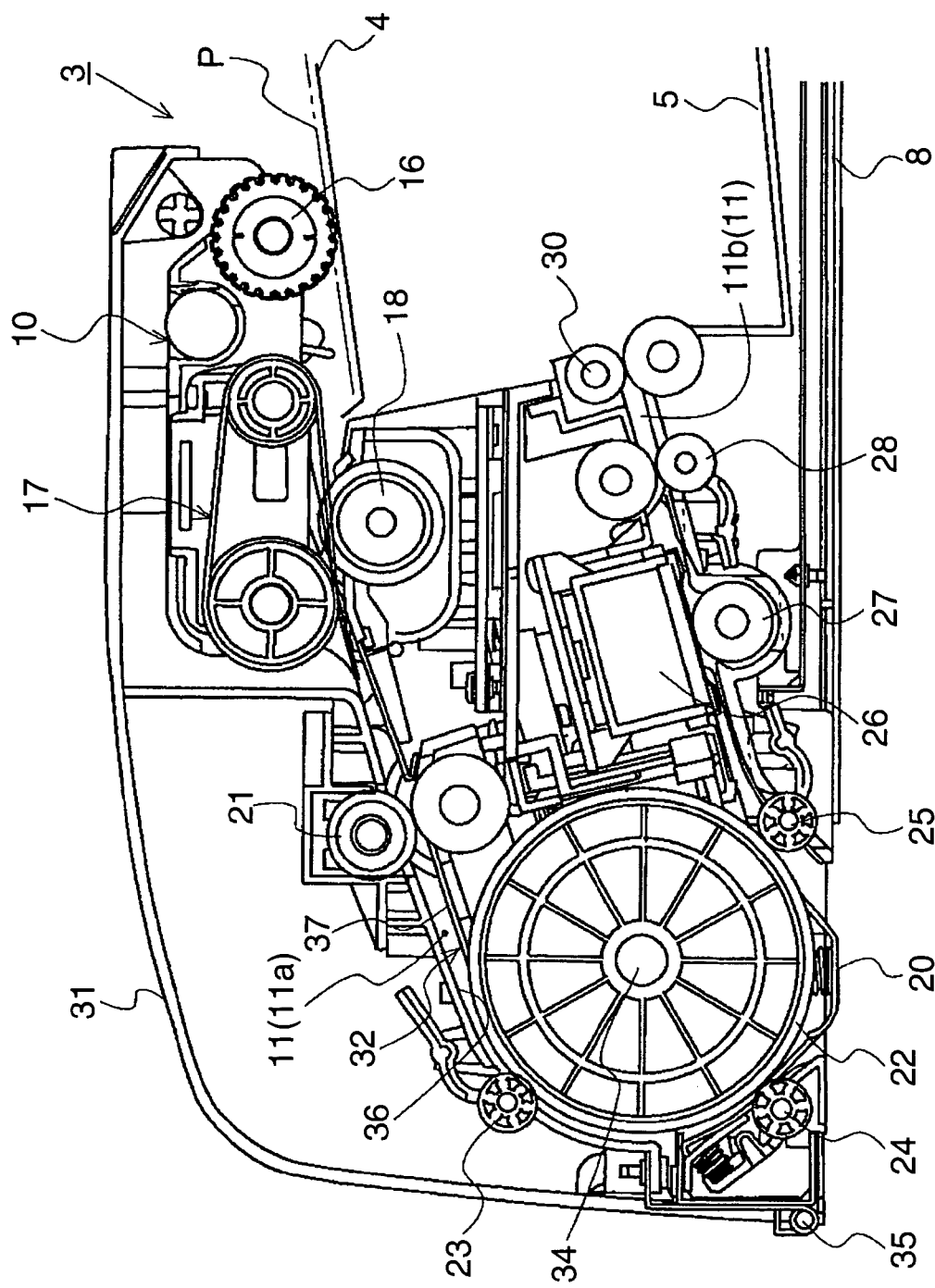
FIG. 6 is a sectional front view showing a document feeding section of the automatic document feeder, wherein the feeder cover is closed.

The automatic document feeder 3 internally has a transport path 11 for transporting a document therethrough. As shown in FIGS. 1 and 6, a document feeding section 10 is disposed on the left (in FIGS. 1 and 6) side of the document tray 4 (on a downstream side of a document feeding direction), and designed to feed documents P stacked on the document tray 4, to the transport path 11 one-by-one. As shown in FIGS. 2 to 4, the document tray 4 is located between a front plate 12 and a rear plate 13, and a pair of width regulating plates 14, 15 are slidably attached to the document tray 4 to regulate a width direction of the documents P to be fed (a direction orthogonal to the document feeding direction).

As shown in FIG. 6, the document feeding section 10 includes a pickup roller 16 disposed at an end of the document tray 4 on the downstream side in the document feeding direction. Further, document feeding means 17 is disposed on a downstream side of the pickup roller 16 in a document transport direction and in adjacent relation to the pickup roller 16, and a separation roller 18 is disposed on an end of the transport path 11 on the side of the document tray 4 (see FIG. 4). The separation roller 18 is kept in rotational contact with the document feeding means 17 so as to separate one of the documents P.

As shown in FIG. 6, the transport path 11 has an approximately U-shape connecting between the upper document tray 4 and the lower document catch tray 5. More specifically, the transport path 11 extends across the image reading section 20, and consists of a transport path 11a leading to the image reading section 20 (serving as a first transport path: hereinafter referred to simply as "pre-reading transport path 11a"), and a transport path 11b extending from the image reading section 20 (serving as a second transport path: hereinafter referred to simply as "post-reading transport path 11b").

As shown in FIGS. 4 and 6, in the pre-reading transport path 11a, a registration roller pair 21 is disposed on the downstream side in a document transport direction relative to the document feeding means 17 and the separation roller 18 and on an upstream side in the document transport direction relative to the image reading section 20. A large-diameter transport roller 22 is disposed in a bottom region of the approximately U-shaped transport path 11 and at a position corresponding to the image reading section 20. A small transport roller 23 in rotational contact with the transport roller 22 is disposed on an outer peripheral surface of the large-diameter transport roller 22 at a position adjacent to the registration roller pair 21 on the downstream side in the document transport direction relative to the registration roller pair 21.

Further, two small transport rollers 24, 25 each in rotational contact with the transport roller 22 are disposed, respectively, in the pre-reading transport path 11a and the post-reading transport path 11b, while interposing the image reading section 20 therebetween. In the post-reading transport path 11b, a rear-face image reading section 26 for reading each rear face of the documents P is disposed on the downstream side in the document transport direction relative to the small transport roller 25, and a transport roller 27 is disposed in opposed relation to the rear-face image reading section 26. A transport roller pair 28 and an ejection roller pair 30 are disposed on the downstream side in the document transport direction relative to the rear-face image reading section 26, in spaced-apart relation to one another in this order.

In FIG. 6, the pickup roller 16 of the automatic document feeder 3 is designed to feed an uppermost one P of the documents P stacked on the document tray 4, to the transport path 11. If two or more of the documents P are fed from the document tray 4 by the pickup roller 16, one or more of the fed documents P coming into no contact with the document feeding means 17 are returned to the document tray 4 by the separation roller 18 which is being rotated in an opposite direction (document returning direction) to that of the document feeding means 17 which is being rotated in the document P feeding direction, and only one of the fed documents P coming into contact with the document feeding means 17 is fed into the transport path 11.

Any skew in the document fed to the transport path 11 is corrected by the registration roller pair 21, and then the corrected document is transported toward the image reading section 20 through the pre-reading transport path 11a by the transport rollers 22, 23. Then, image data in an front face of the document P is read by scanning or reading means (not shown) disposed in the image reading section 20.

Then, the document P passed through the image reading section 20 is transported through the post-reading transport path 11b by each of the transport rollers 22, 25, 27, 28. When the document P is a single-sided document, it is ejected directly onto the document catch tray 5 by the ejection roller pair 30. When the document P is a double-sided document, image data in a rear face of the document P is read by the rear-face image reading section 26, and then the document P is ejected onto the document catch tray 5 by the ejection roller pair 30.

This type of automatic document feeder 3 involves the risk of occurrence of a sheet jam due to influences of paper quality of the document P, frictions of the transport rollers 22, 23, 24, 25, 27, 28 and the ejection roller pair 30 or other factor.

As shown in FIGS. 3 to 7, the automatic document feeder 3 according to this embodiment includes a feeder cover 31 attached to the feeder body 8 in an openable and closable manner, and an intermediate transport unit 32 swingably attached to the feeder body 8 to serve as an inward guide surface of the approximately U-shaped transport path 11. The intermediate transport unit 32 is designed to be swingably moved in conjunction with opening and closing movements of the feeder cover 31 (see, particularly, FIGS. 5 and 7), so as to largely widen the transport path 11 and facilitate an operation for removing a jammed document in the transport path 11.

Figure 5:
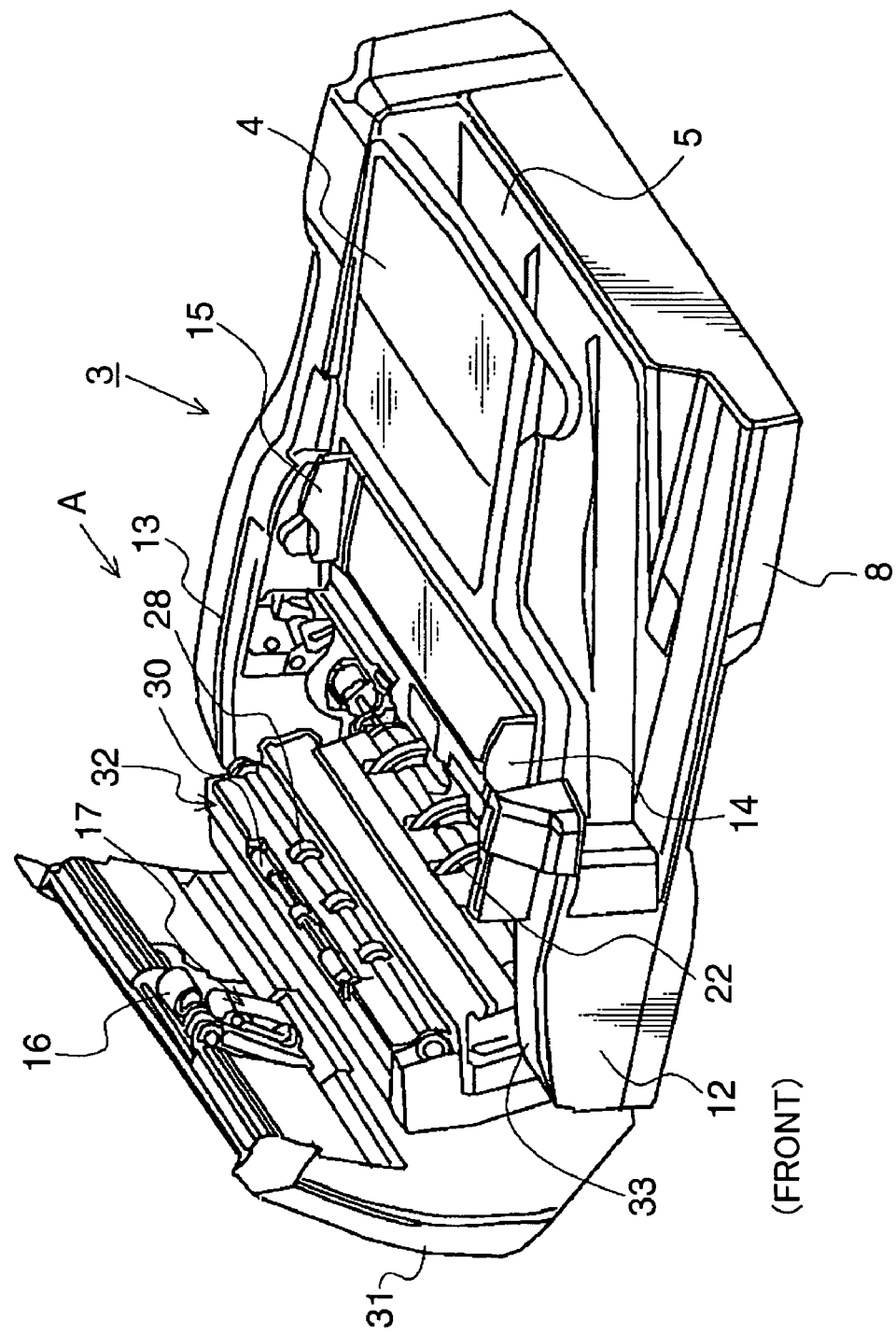
FIG. 5 is a perspective view showing the automatic document feeder, wherein the feeder cover and an intermediate transport unit of the automatic document feeder are swingingly moved to allow a transport path largely widened.

Further, in order to allow a document in the pre-reading transport path 11a to be visually checked even from the front side of the image forming apparatus 1 in a state after the feeder cover 31 is opened, the automatic document feeder 3 according to this embodiment is designed such that the front plate 12 has an outer edge 33 formed to extend to the vicinity of the image reading section 20 along the pre-reading transport path 11a (an outer surface of the intermediate transport unit 32), as shown in FIGS. 3 and 5. More specifically, the outer edge 33 which is a peripheral edge of the front plate 12 located in opposed relation to the feeder cover 31 is formed to have an outer shape approximately in conformity to a shape of the pre-reading transport path 11a when viewed from the front side in a direction orthogonal to the document feeding direction (document transport direction). Thus, in the state after the feeder cover 31 is opened, a document held in the pre-reading transport path 11a can be visually checked from the front side without blocking of operator's view due to the front plate. A structure for clearing a sheet jam in the automatic document feeder 3 will be described in detail below.

Figure 7:
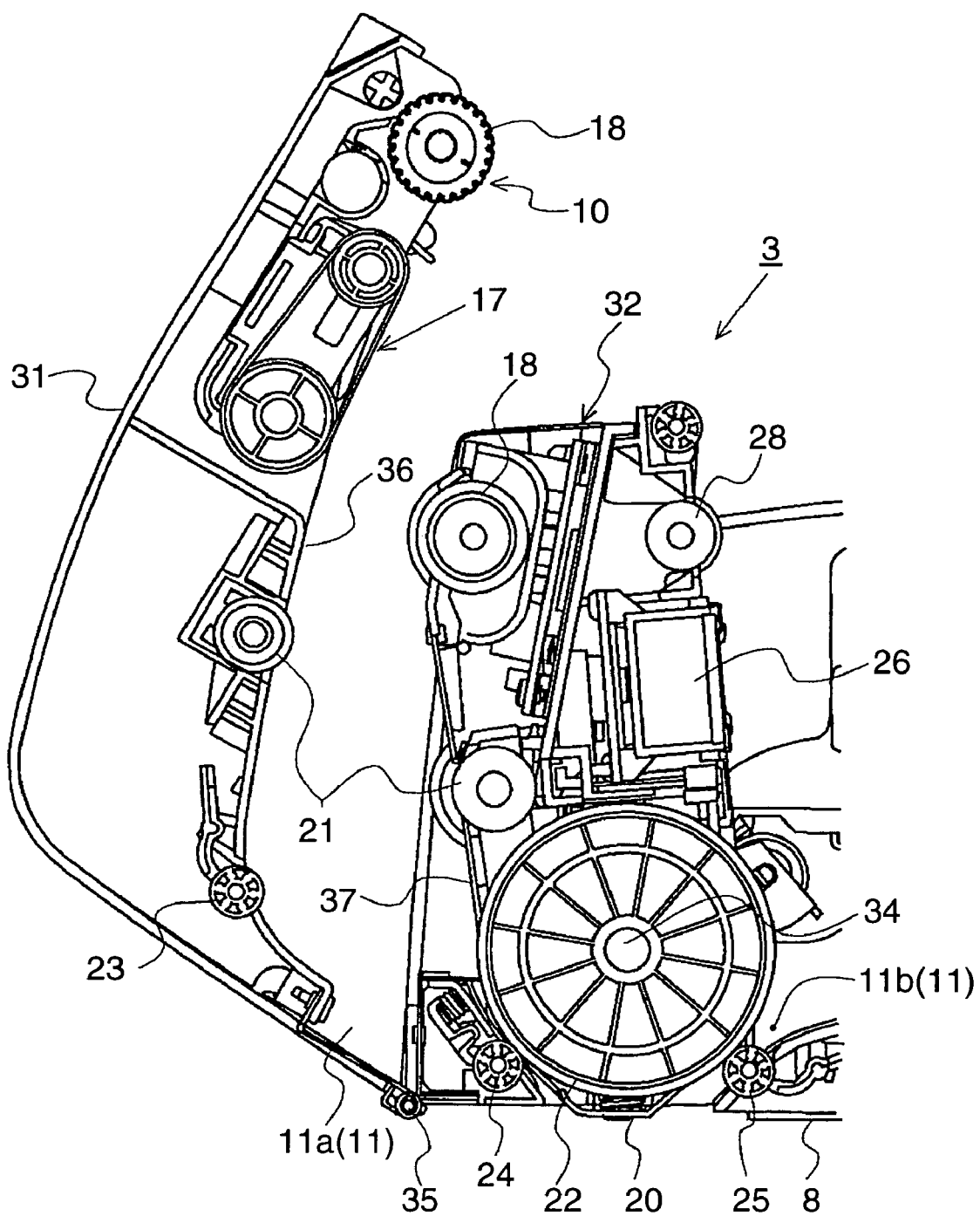
FIG. 7 is a sectional front view showing the document feeding section of the automatic document feeder, wherein the feeder cover and the intermediate transport unit are swingingly moved.

As shown in FIGS. 6 and 7, the feeder cover 31 is swingably supported by the feeder body 8 through a first support member 35 located at a position apart from a rotation shaft 34 of the transport roller 22. The pickup roller 16 is rotatably attached to an inner surface of the feeder cover 31 which is to be located in opposed relation to the document tray 4 when the feeder cover 31 is in a closed position illustrated in FIG. 6. The inner surface of the feeder cover 31 opposed to the intermediate transport unit 32 serves as an outward guide surface 36 of the pre-reading transport path 11a. The document feeding means 17, one registration roller in the registration roller pair 21 and the small transport roller 23 are disposed along the outward guide surface 36 in this order in a direction toward the image reading section 20. The feeder cover 31 can be opened as shown in FIG. 7 from the closed position illustrated in FIG. 6 to largely widen the pre-transport path 11a.

When the feeder cover 31 is opened at a given angle or more, the feeder cover 31 and the intermediate transport unit 32 are interlocked with one another by a posture change mechanism 40, and the intermediate transport unit 32 is largely swung from a position illustrated in FIG. 6 to a position illustrated in FIG. 7 in conjunction with the swing movement of the feeder cover 31.

Figure 8:
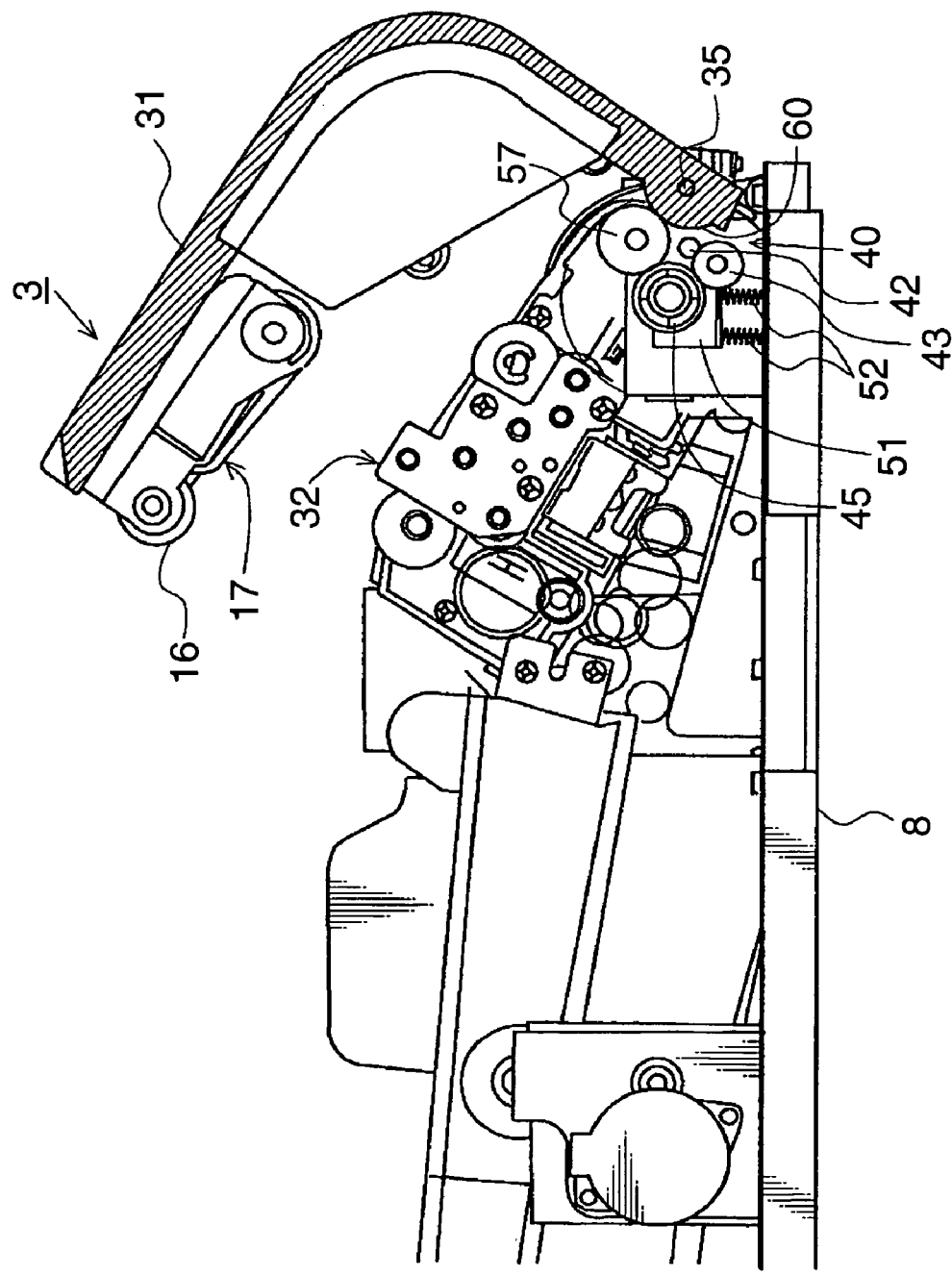
FIG. 8 is a sectional back view showing a posture change mechanism of the automatic document feeder.
Figure 9:
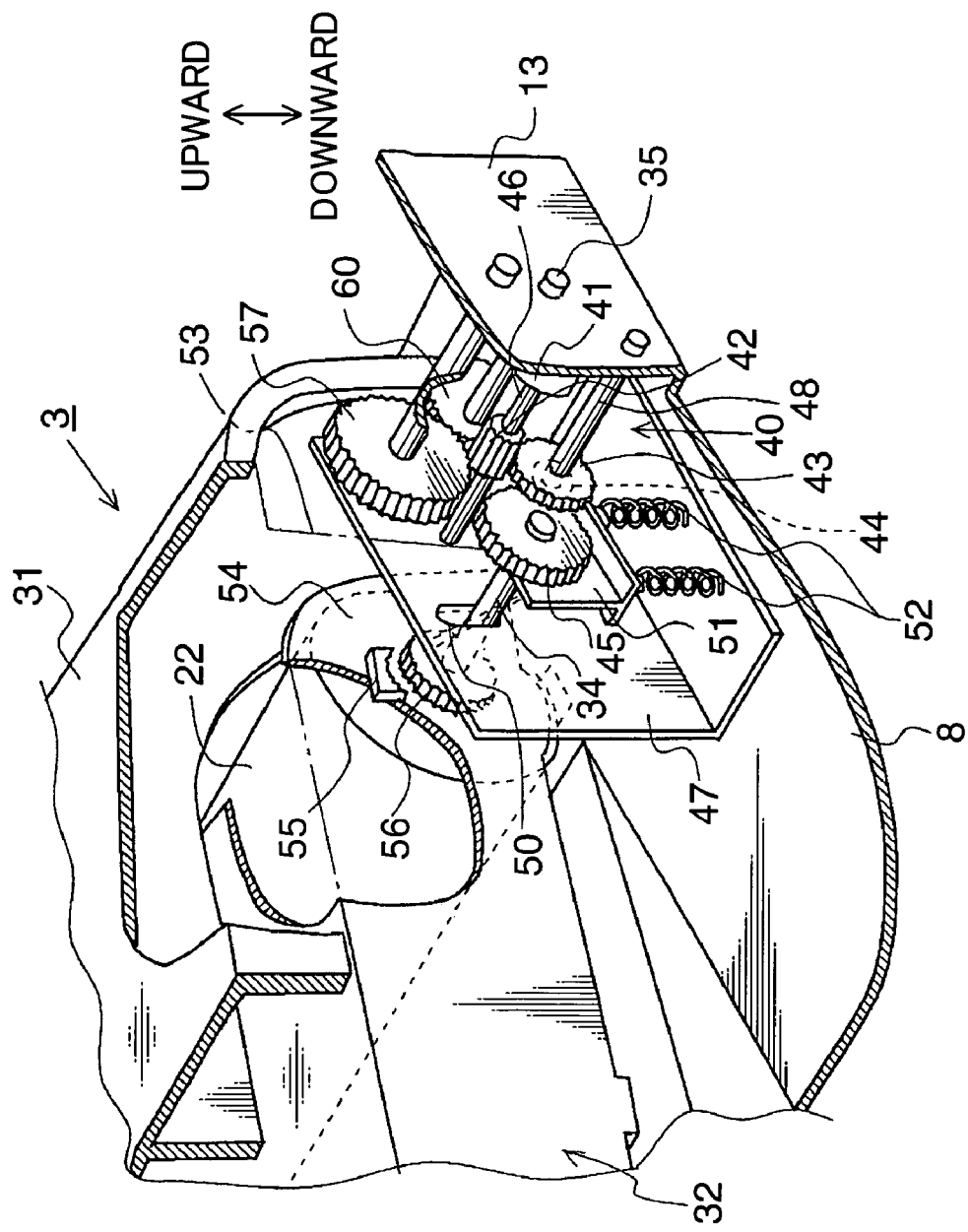
FIG. 9 is a partially cut-out perspective view showing the rear plate and a part of the feeder cover together with the posture change mechanism, wherein the feed cover is closed.
Figure 10:
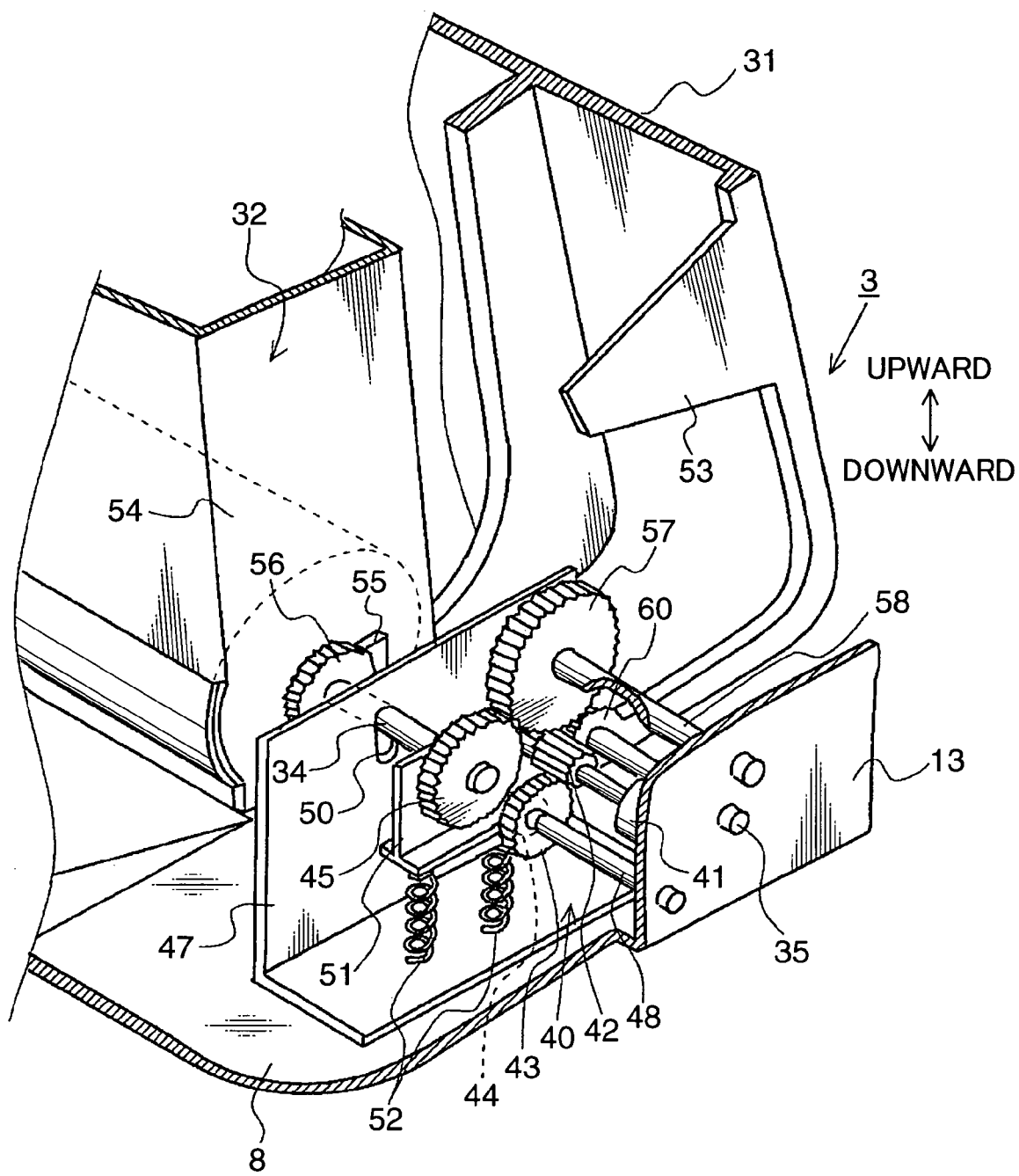
FIG. 10 is a partially cut-out perspective view showing the rear plate and a part of the feeder cover together with the posture change mechanism, wherein the feed cover is opened.

FIGS. 8 to 10 show the posture change mechanism 40 attached on the side of the rear plate 13, viewing from the direction indicated by the arrow A in FIGS. 4 and 5, wherein the automatic document feeder 3 is appropriately cut out. Among them, FIG. 9 shows the posture change mechanism 40 in a state when the feeder cover 31 is in the closed position (see FIGS. 2 and 6), wherein the posture change mechanism 40 does not interlock between the feeder cover 31 and the intermediate transport unit 32. FIG. 10 shows the posture change mechanism 40 in a state when the feeder cover 31 is in an opened position (see FIGS. 5 and 7), wherein the posture change mechanism 40 interlocks between the feeder cover 31 and the intermediate transport unit 32.

The posture change mechanism 40 comprises a shaft support plate 47 formed with an elongated hole 50 through which the rotation shaft 34 of the transport roller 22 is inserted, a movable shaft support plate 51 designed to be brought into contact with the rotation shaft 34 so as to apply an upward biasing force to the rotation shaft 34, a spring 52 for generating the biasing force, a roller driving gear 45 and a clutch gear 56 each fixed concentrically to the rotation shaft 34, a gear stopper 55 fixed to a back plate 54 of the intermediate transport unit 32 and designed to be engageable with the clutch gear 56, an idle gear 57 engageable with the roller driving gear 45, a pressing portion 53 formed in the feeder cover 31, and an arc-shaped gear 60.

In the state illustrated in FIG. 9, a rotation of a motor 41 for generating a torque is transmitted to the rotation shaft 34 of the transport roller 22 through the pinion gear 42, two idle gears 43, 44, and the roller driving gear 45 fixed to the rotation shaft 34, at a reduced rotation speed. The pinion gear 42 is fixed to a rotation shaft 46 of the motor 41, and disposed in a space between the back plate 13 and the shaft support plate 47 fixed to the feeder body 8. Each of the idle gears 43, 44 is fixed to a support shaft 48 rotatably attached to the rear plate 13 and the shaft support plate 47 to extend therebetween. The rotation shaft 34 having the roller driving gear 45 fixed at an end thereof is disposed to extend into a space between the shaft support plate 47 and the rear plate 13 after penetrating the elongated hole 50 formed in the shaft support plate 47, and rotatably supported by the movable shaft support plate 51 disposed between the rear plate 13 and the shaft support plate 47.

The rotation shaft 34 is constantly biased upward by the spring 52 through the movable shaft support plate 51. When the feeder cover 31 is in the closed position, the rotation shaft 34 is pressed on a lower end of the elongated hole 50 by the pressing portion 53 of the feeder cover 31, in such a manner as to be rotatably positioned by the lower end of the elongated hole 50. This technique of supporting a rear end of the rotation shaft 34 is used for a front end thereof in common. Although not illustrated, the front end of the transport roller 22 is engaged with an elongated hole of a frame formed in a front portion of the feeder body 8, while being constantly biased upward by a spring. Further, when the feeder cover 31 is in the closed position, the front end of the rotation shaft 34 is pressed on a lower end of the elongated hole by a pressing portion and positioned by the lower end of the elongated hole. Thus, the opposite ends of the rotation shaft 34 of the transport roller 22 can be vertically moved along the elongated holes 50.

When the feeder cover 31 is opened from the closed position illustrated in FIG. 9 (see FIG. 8), the movable shaft support plate 51 biased upward by the springs 52, 52 is moved upward along with a movement of the pressing portion 53 of the feeder cover 31. Thus, the rotation shaft 34 is slidingly moved upward along the elongated hole 50 of the shaft support plate 47. Consequently, the engagement between the roller driving gear 45 and the idle gear 44 is released.

When a swing angle of the feeder cover 31 in an opening direction becomes equal to or greater than a given value, the gear stopper 55 fixed to the back plate 54 of the intermediate transport unit 32 is engaged with the clutch gear 56 fixed to the rotation shaft 34, and the roller driving gear 45 is engaged with the idle gear 57. The idle gear 57 is fixed to a support shaft 58 rotatably attached to the rear plate 13 and the shaft support plate 47 to extend therebetween, and engaged with an arc-shaped gear 60 formed concentrically with the first support section 35 of the feeder cover 31. The feeder cover 31 is rotatably supported by the feeder body 8 through the first support section 35.

When the feeder cover 31 is further moved at a swing angle greater than the given angle in the opening direction, the swing movement of the feeder cover 31 is transmitted to the intermediate transport unit 32 through the arc-shaped gear 60, the idle gear 57, the roller driving gear 45, the rotation shaft 34, the clutch gear 56 and the gear stopper 55, and the intermediate transport unit 32 is swingingly moved to a position illustrated in FIG. 10 about the rotation shaft (second support member) 34 in conjunction with the swing movement of the feeder cover 31. When the feeder cover 31 is in a fully opened position illustrated in FIG. 10, each of the pre-reading transport path 11a and the post-reading transport path 11b has a maximum width (see FIG. 7). In the state illustrated in FIG. 10, each of the opposite ends of the rotation shaft 34 is biased by the springs 52, 52, and moved to a position adjacent to an upper end of the corresponding elongated hole 50. Thus, a large gap is formed between the feeder roller 22 and the image reading section 20 to facilitate checking and removing a jammed document (see FIG. 7).

As above, the position of the swing center (first support member 35) of the feeder cover 31 is spaced apart from the position of the swing center (rotation shaft 34 as second support member) of the intermediate transport unit 32. This makes it possible to largely widen not only the pre-reading transport path 11a but also the post-reading transport path 11b (see FIG. 7). Thus, regardless of a position of a jammed document in the transport path 11, the jammed document can be visually checked from a position obliquely above or above the automatic document feeder 3 without difficulty, and an operator can readily put his/her hand into the largely widened transport path to facilitate the operation for removing the jammed document (jam clearance).

Further, as shown in FIGS. 3 and 4, the outer edge 33 of the front plate 12 is formed to allow an operator to visually check a document at least in a region of the pre-reading transport path 11a between the end of the pre-reading transport path 11a on the side of the document tray 4 and the vicinity of the image reading section 20 (see FIG. 6), from the front side of the front plate (in a direction orthogonal to a side surface of the front plate 12 and orthogonal to the document feeding direction). For example, the outer edge 33 of the front plate 12 is formed to be located at a height equal to an outer wall surface 37 of a frame of the intermediate transport unit 32 serving as the inward guide surface of the pre-reading transport path 11a, or at a position located on the inward side relative to the outer wall surface 37 (at a position lower than that of the outer wall surface 37).

In the automatic document feeder 3 having above structure, a document in the pre-reading transport path 11a can be checked from the front side only by opening the feeder cover 31 at a slight swing angle. That is, in a course of moving the feeder cover 31 from the closed position to the open position (as well as in the state after the feeder cover 32 is moved to the fully opened position), a document in the pre-reading transport path 11a can be checked from the front side. Thus, even if the automatic document feeder 3 is mounted on the upper portion of the apparatus body 2 as shown in FIG. 1, and a document is jammed in the pre-reading transport path 11a, an operator who is in a relatively low posture, for example, in a wheelchair or short in height, can check the state of paper jam. Then, the operator can swingingly move the feeder cover 31 by herself/himself to remove the jammed document, or can ask an assistant for help. This makes it possible to perform a jam clearance operation within a short time, and further facilitate a jam clearance operation in combination with an effect of simplification in jam clearance operation based on the posture change mechanism 40.

When the feeder cover 31 is closed from the fully opened position illustrated in FIGS. 5, 7 and 10, the swing movement of the feeder cover 31 in a closing direction is transmitted to the intermediate transport unit 32 through the posture change mechanism 40, and the intermediate transport unit 32 is swingingly moved in a closing direction in conjunction with the swing movement of the feeder cover 31.

Then, when the feeder cover 31 is fully swung in a closing direction, and the pressing portion 53 of the feeder cover 31 presses the rotation shaft 34 downward against the springs 52, 52, the respective engagements between the gear stopper 55 and the clutch gear 56 and between the roller driving gear 45 and the idle gear 57 are released, and the interlocked state is returned to the non-interlocked state illustrated in FIG. 9. In this state, the roller driving gear 46 and the idle gear 44 are engaged with one another, and the motor 41 and the transport roller 22 are coupled to one another through the pinion gear 42, the idle gears 43, 44, and the roller driving gear 45.

In this embodiment, an lower side edge 61 of the feeder cover 31 corresponding to the front plate 12 may be formed to extend along the outer edge 33 of the front plate 12 (in such a manner as to be located in opposed relation to the outer edge 33), as shown in FIG. 2. In this case, a document in the pre-reading transport path 11a can be checked from the front side only by opening the feeder cover 31 at a slight swing angle so as to further facilitate the checking operation of a document jam in the pre-reading transport path 11a and a jam clearance operation.

The present invention is not limited to the above embodiment. A gap between the outer edge 33 of the front plate 12 and the lower side edge 61 of the feeder cover 31 may be sufficiently increased to allow a document in the pre-reading transport path 11a to be checked from the front side of the front plate without opening the feeder cover so as to further facilitate the checking operation of a document jam in the pre-reading transport path 11a and a jam clearance operation.

Example of Modification of Automatic Document Feeder

Figure 11:
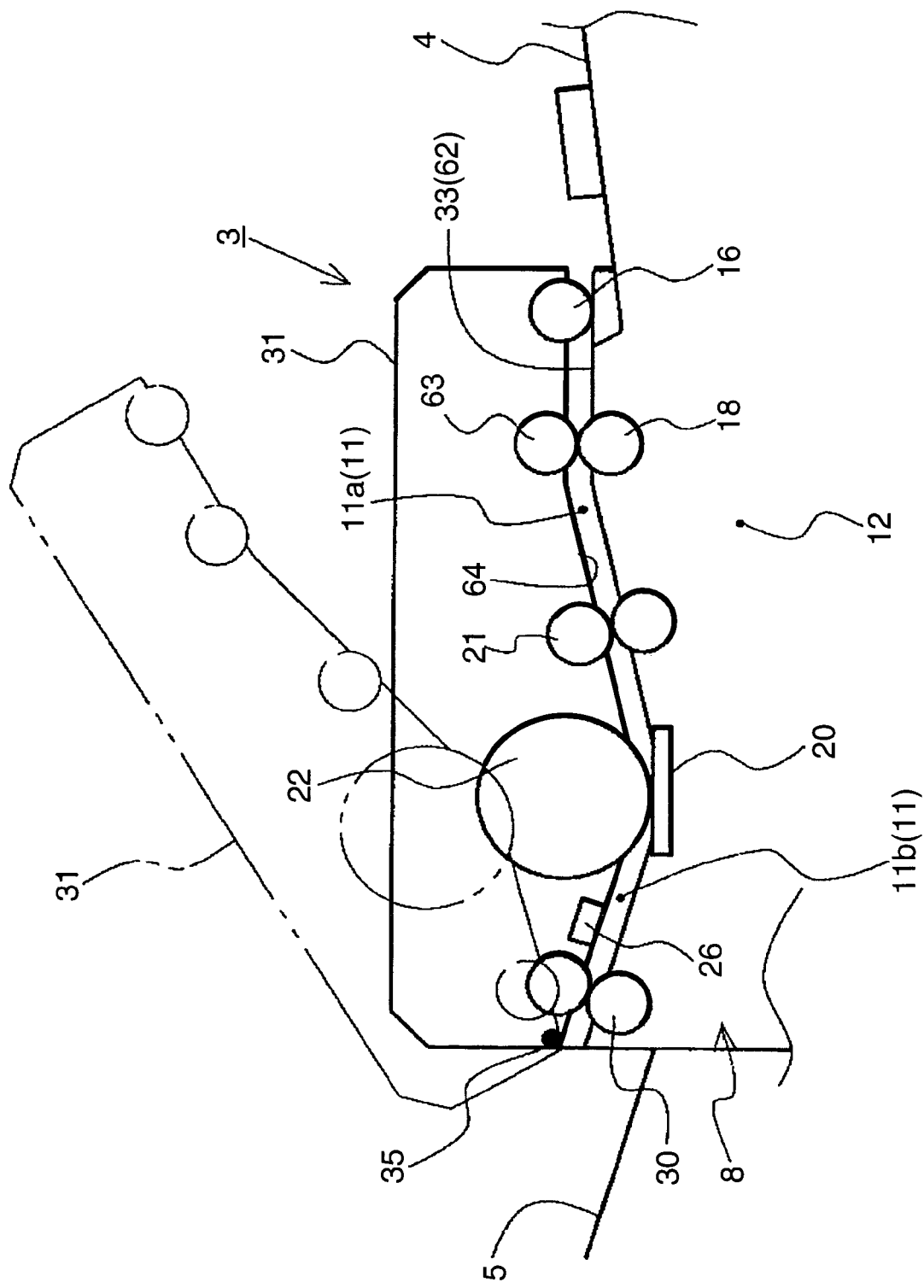
FIG. 11 is a schematic diagram showing an example of modification of the automatic document feeder.
Figure 12:
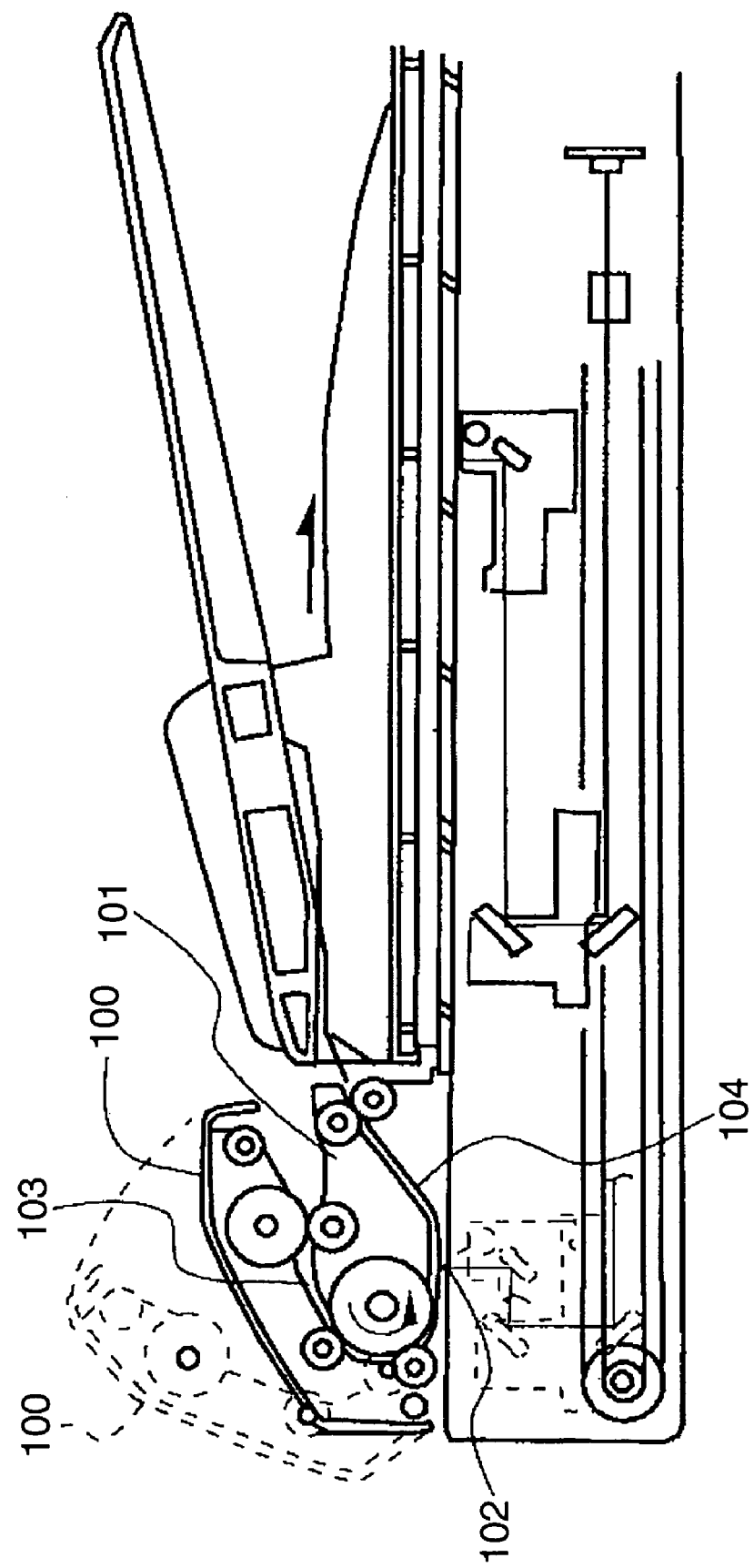
FIG. 12 is a schematic diagram showing an automatic document feeder as a first conventional example, wherein a feeder cover of the automatic document feeder is closed.
Figure 13:
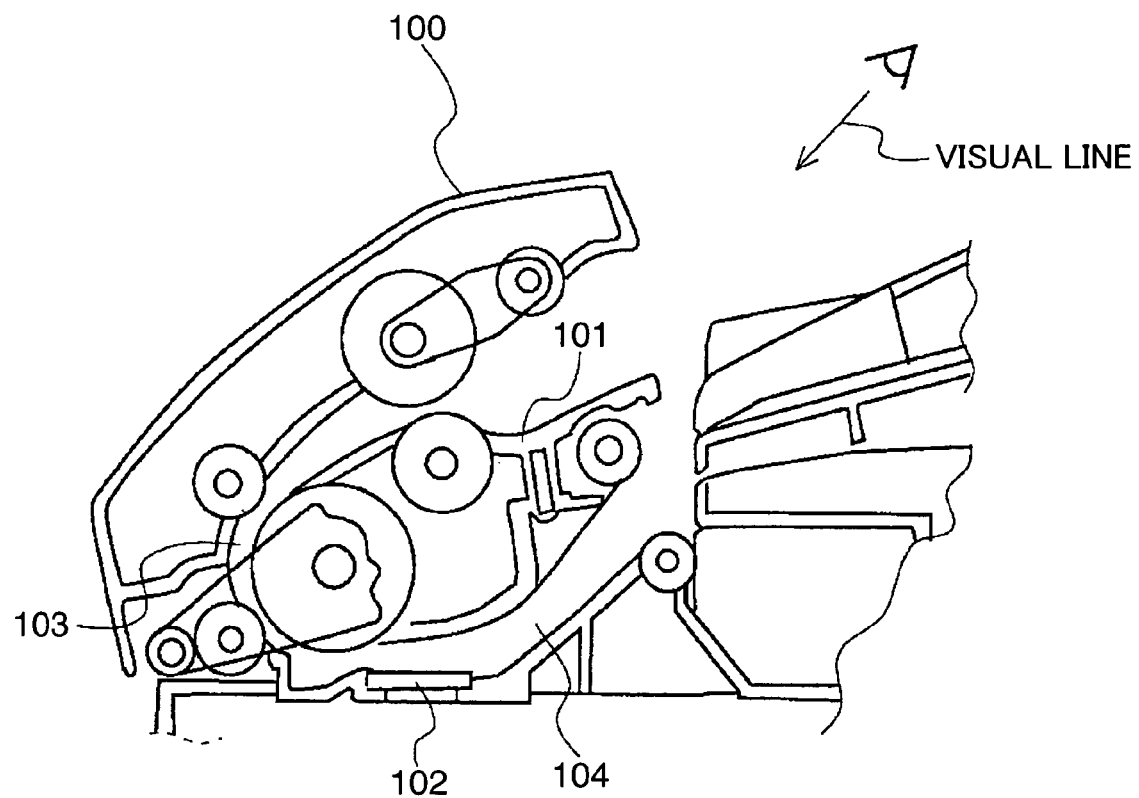
FIG. 13 is a schematic diagram showing the automatic document feeder as the first conventional example, wherein the feeder cover is opened.
Figure 14:
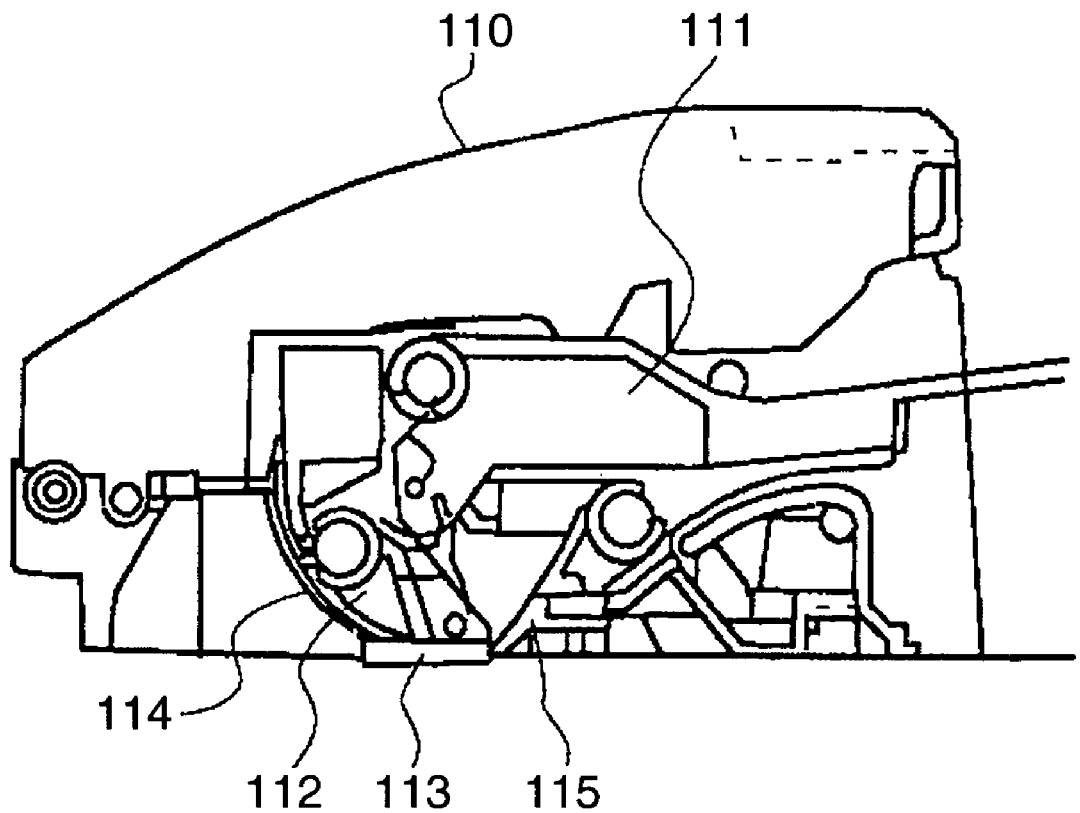
FIG. 14 is a schematic diagram showing an automatic document feeder as a second conventional example, wherein a feeder cover of the automatic document feeder is closed.
Figure 15:
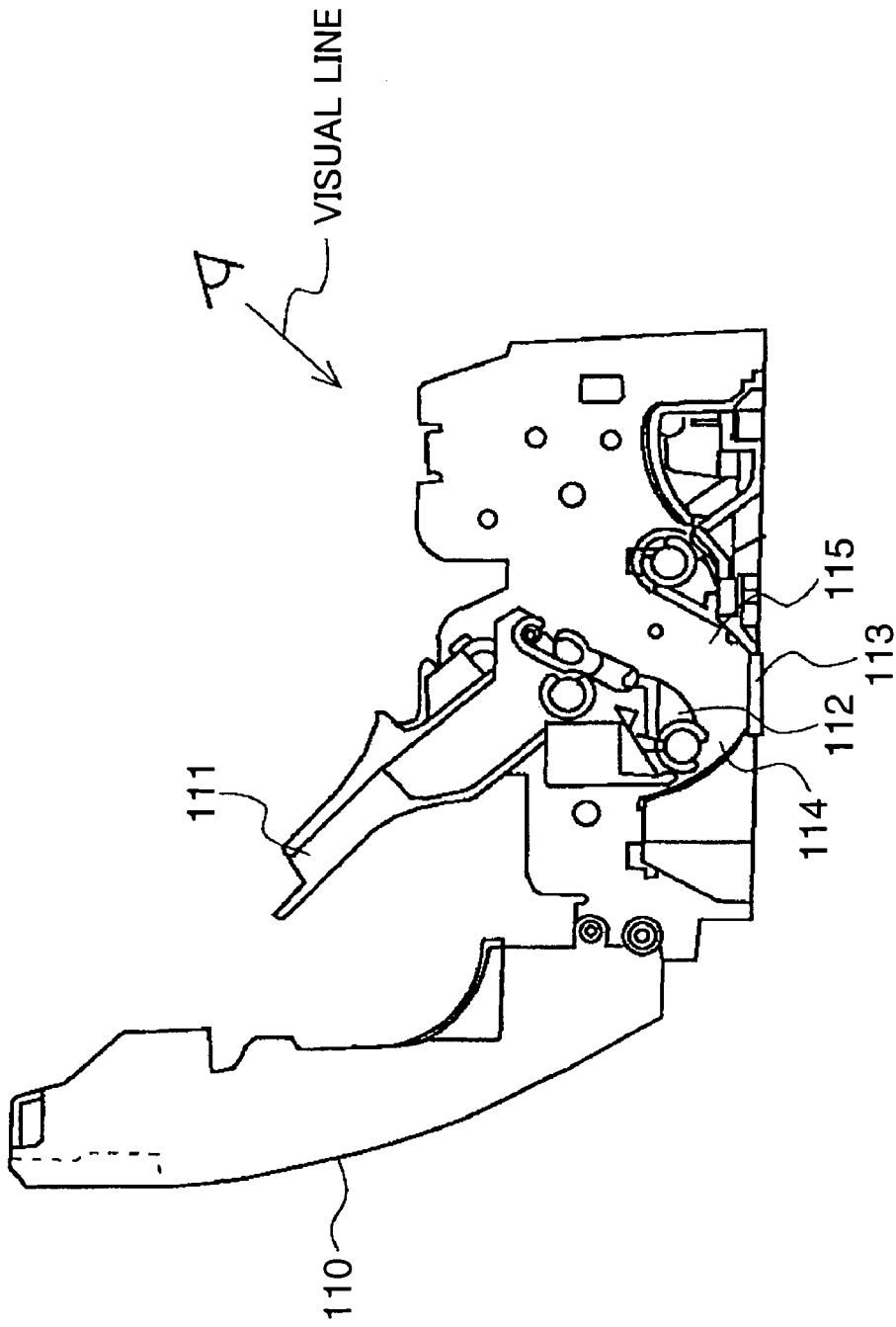
FIG. 15 is a schematic diagram showing the automatic document feeder as the second conventional example, wherein the feeder cover is opened.

The transport path in the present invention is not limited to the approximately U-shaped transport path 11 as in the above embodiment. For example, as shown in FIG. 11, an automatic document feeder 3 may comprise a transport path 11 which is formed in an approximately I shape to transport a document in one direction (from the right side to the left side in FIG. 11), and provided with an image reading section 20 and a rear-face image reading section 26 interposed therein.

In the automatic document feeder 3 as this example of modification, a front plate 12 is formed to have an outer edge 33 located at a height approximately equal to or lower than a lower guide surface 62 of the transport path 11, so as to allow a document in a pre-reading transport path 11a leading to the image reading section 20 and a post-reading transport path 11b extending from the image reading section 20, to be visually checked from the front side and from a position obliquely above the automatic document feeder 3.

Specifically, in the automatic document feeder 3 as this example of modification, one end of a feeder cover 31 is swingably supported at a left (in FIG. 11) end of a feeder body 8 (at a position adjacent to a downstream end of the post-reading transport path 11b) through a first support member 35. Thus, the feeder cover 31 can be swingingly moved about the first support member 35 to largely open a top surface of the feeder body 8 (the lower guide surface 62 of the transport path 11 and the outer edge 33 of the front plate).

Thus, as with the aforementioned embodiment, in this example of modification, even if the automatic document feeder 3 is mounted on an upper portion of a body 2 of an image forming apparatus, and a document is jammed in the pre-reading transport path 11a, an operator who is in a relatively low posture, for example, in a wheelchair or short in height, can visually check the state of document jam only by slightly opening the feeder cover 31. Then, the operator can swingingly move the feeder cover 31 by herself/himself to remove the jammed document, or can ask an assistant for help.

In the automatic document feeder 3 as this example of modification, one or more documents (not shown) on a document tray 4 are fed by a pickup roller 16 attached to the feeder cover 31, and only one of the documents is fed to the pre-reading transport path 11a by a feed roller 63 serving as document feeding means and a separation roller 18. Then, the document is transported between a transport roller 22 and the image reading section 20 through a registration roller pair 21 to read or scan the document. Then, the automatic document feeder 3 transports the document to the post-reading transport path 11b by the transport roller 22. When the document is a double-sided document, a rear face of the document is read by a rear-face image reading section 26, and then the document is ejected onto a document catch tray 5 by an ejection roller pair 30. The feed roller 63, one registration roller in the registration roller pair 21, the transport roller 22, the rear-face image reading section 26 and one ejection roller in the ejection roller pair 30 are attached along a lower surface of the feeder cover 31 corresponding to an upper guide surface 64 of the transport path 11.

According to the image forming apparatus according to the above embodiment, even if the automatic document feeder 3 is mounted on the upper portion of the body 2 of the image forming apparatus, an operator who is in a relatively low posture, for example, in a wheelchair or short in height, can visually a document jammed in the pre-reading transport path 11a. Then, the operator can swingingly move the feeder cover 31 by herself/himself to remove the jammed document, or can ask an assistant for help. Thus, the image forming apparatus has advantages of being able to perform a jam clearance operation within a short time and simplify the jam clearance operation.

The automatic document feeder may be mounted to an image reading section of a scanner apparatus as well as the image forming apparatus.

This application is based on patent application No. 2005-156676 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An automatic document feeder for allowing documents stacked on a document tray to be automatically passed through an image reading section disposed at a given position, and ejected to a document catch tray, comprising:
   a front plate located on a given one of opposite sides of said document feeder in a direction orthogonal to a feeding direction of the documents on said document tray, the front plate having opposite upper and lower edges;
   a rear plate located on the other side in said orthogonal direction and in opposed relation to said front plate so that the front and rear plates are spaced apart along a front-to-rear direction;
   a first transport path located between said front plate and said rear plate, and adapted to guide the document fed from said document tray, to said image reading section;
   a second transport path located between said front plate and said rear plate, and adapted to guide said document passed through said document tray, to said document catch tray; and
   a feeder cover attached to a feeder body of said automatic document feeder in an openable and closable manner, said feeder cover defining a part of said first transport path when the feeder cover is in a closed position and exposes said first transport path when the feeder is in an opened position, the feeder cover having a lower edge that abuts on top of the upper edge of the front plate when the feeder cover is in the closed position,
   wherein the upper edge of said front plate is formed to be located at a height substantially equal to a lower surface of said first transport path, said upper edge facing outwardly and away from the second transport path and being formed in a shape substantially in conformity to a shape of said first transport path when viewed from a side of the front plate and in the front-to-rear direction to allow the document located in a region of said first transport path between one end of said first transport path on the side of said document tray and the vicinity of said image reading section to be visually checked when viewed from the side of said front plate in said orthogonal direction.

2. The automatic document feeder as defined in claim 1, wherein said feeder cover is swingably supported by said feeder body through a support member disposed at a given position, in such a manner as to be changed in posture between said closed position and said opened position based on a swing movement about said support member.

3. The automatic document feeder as defined in claim 1, wherein said lower edge of the feeder cover extends along the upper edge of said front plate in said closed position.

4. The automatic document feeder as defined in claim 1, wherein the lower edge of said feeder cover is formed to define a gap having a given distance between said lower edge of said feeder cover and said upper edge of the front plate in said closed position.

5. The automatic document feeder as defined in claim 1, wherein said first transport path and said second transport path are defined as an approximately U-shaped transport path extending across said image reading section.

6. The automatic document feeder as defined in claim 5, which further includes an intermediate transport unit adapted to serve as an inward guide surface of said approximately U-shaped transport path, wherein the upper edge of said front plate is formed to be located at a height approximately equal to or lower than that of an outer wall surface of a frame of said intermediate transport unit.

7. The automatic document feeder as defined in claim 1, wherein:
said first transport path and said second transport path are defined as an approximately U-shaped transport path extending across said image reading section; and
said automatic document feeder further includes an intermediate transport unit adapted to serve as an inward guide surface of said approximately U-shaped transport path,
wherein:
said feeder body is adapted to serve as an outward guide surface of said approximately U-shaped transport path and define a part of said second transport path;
each of said front plate and said rear plate is attached to said feeder body;
said feeder cover is swingably supported by said feeder body through a first support member disposed at a given position, in such a manner as to serve as an outward guide surface of said approximately U-shaped transport path and define a part of said first transport path; and
said intermediate transport unit is swingably attached to said feeder body by a second support member disposed at a given position apart from said first support member,
whereby, when said feeder cover is swingably moved and opened in a direction allowing said feeder cover to be spaced apart from said intermediate transport unit, and said intermediate transport unit is swingably moved in a direction allowing said intermediate transport unit to be spaced apart relative to said second transport path defined by said feeder body, each of said first transport path and said second transport path is widened toward an outward direction.

8. The automatic document feeder as defined in claim 1, wherein said first transport path and said second transport path are defined as an approximately U-shaped transport path extending across said image reading section.

9. An image forming apparatus comprising:
an apparatus body including a printing section for performing an image forming operation; and
an automatic document feeder mounted on an upper portion of said apparatus body and designed to allow documents stacked on a document tray to be automatically passed through an image reading section disposed at a given position, and ejected to a document catch tray, said automatic document feeder including:
a front plate located on a given one of opposite sides of said document feeder in a direction orthogonal to a feeding direction of the documents on said document tray;
a rear plate located on the other side in said orthogonal direction and in opposed relation to said front plate so that the front and rear plates are spaced apart along a front-to-rear direction;
a first transport path located between said front plate and said rear plate, and adapted to guide the document fed from said document tray, to said image reading section; and
a second transport path located between said front plate and said rear plate, and adapted to guide said document passed through said document tray, to said document catch tray,
wherein said front plate has an upper edge and a lower edge opposite the upper edge, the lower edge abutting on top of the upper portion of said apparatus body, the upper edge being formed to be located at a height substantially equal to a lower surface of said first transport path, said upper edge facing outwardly and away from the upper portion of the apparatus body and away from the second transport path, the upper edge being formed in a shape substantially in conformity to a shape of said first transport path when viewed from a side of the front plate and in the front-to-rear direction to allow the document located in a region of said first transport path between one end of said first transport path on the side of said document tray and the vicinity of said image reading section to be visually checked when viewed from the side of said front plate in said orthogonal direction.

10. The image forming apparatus as defined in claim 9, wherein said automatic document feeder further includes a feeder cover attached to a feeder body of said automatic document feeder in an openable and closable manner, said feeder cover being designed to define a part of said first transport path when the feeder cover is in a closed position, and exposes said first transport path to outside when the feeder cover is in an opened position, the front plate and the rear plate being disposed between the feeder cover and the upper portion of the apparatus body when the feeder cover is in the closed position, whereby in a state after said feeder cover is moved from said closed position to said opened position or in the course of said movement, the document located in said first transport path is allowed to be visually checked when viewed from the side of said front plate and substantially along the front-to-rear direction.

11. The image forming apparatus as defined in claim 10, wherein said feeder cover is swingably supported by said feeder body through a support member disposed at a given position, in such a manner as to be changed in posture between said closed position and said opened position based on a swing movement about said support member.

12. The image forming apparatus as defined in claim 10, wherein said feeder cover has a lower edge which is located on the side corresponding to said front plate, and formed to extend along the upper edge of said front plate in said closed position.

13. The image forming apparatus as defined in claim 10, wherein said feeder cover has a lower edge which is located on the side corresponding to said front plate, and formed to define a gap having a given distance between said lower edge and said upper edge in said closed position.

14. The image forming apparatus as defined in claim 9, wherein said first transport path and said second transport path are defined as an approximately U-shaped transport path extending across said image reading section.

15. The image forming apparatus as defined in claim 14, wherein said automatic document feeder further includes an intermediate transport unit adapted to serve as an inward guide surface of said approximately U-shaped transport path, wherein the upper edge of said front plate is formed to be located at a height approximately equal to or lower than that of an outer wall surface of a frame of said intermediate transport unit.

16. The image forming apparatus as defined in claim 10, wherein:
   said first transport path and said second transport path are defined as an approximately U-shaped transport path extending across said image reading section; and
   said automatic document feeder further includes an intermediate transport unit adapted to serve as an inward guide surface of said approximately U-shaped transport path,
   wherein:
   said feeder body is adapted to serve as an outward guide surface of said approximately U-shaped transport path and define a part of said second transport path;
   each of said front plate and said rear plate is attached to said feeder body;
   said feeder cover is swingably supported by said feeder body through a first support member disposed at a given position, in such a manner as to serve as an outward guide surface of said approximately U-shaped transport path and define a part of said first transport path; and
   said intermediate transport unit is swingably attached to said feeder body through a second support member disposed at a given position apart from said first support member,
   whereby, when said feeder cover is swingably moved and opened in a direction allowing said feeder cover to be spaced apart from said intermediate transport unit, and said intermediate transport unit is swingably moved in a direction allowing said intermediate transport unit to be spaced apart relative to said second transport path defined by said feeder body, each of said first transport path and said second transport path is widened toward an outward direction.

17. The image forming apparatus as defined in claim 9, wherein said first transport path and said second transport path are defined as an approximately U-shaped transport path extending across said image reading section.

* * * * *